(12) United States Patent
Johnson

(10) Patent No.: US 10,694,719 B2
(45) Date of Patent: Jun. 30, 2020

(54) SELF-CLEANING PET GROOMING SCRUB BRUSH

(71) Applicant: Bobby J. Johnson, Grosse Pointe Farms, MI (US)

(72) Inventor: Bobby J. Johnson, Grosse Pointe Farms, MI (US)

(*) Notice: Subject to any disclaimer, the term of this patent is extended or adjusted under 35 U.S.C. 154(b) by 124 days.

(21) Appl. No.: 16/016,875

(22) Filed: Jun. 25, 2018

(65) Prior Publication Data

US 2018/0368363 A1 Dec. 27, 2018

Related U.S. Application Data

(60) Provisional application No. 62/523,953, filed on Jun. 23, 2017.

(51) Int. Cl.
| | | |
|---|---|---|
| *A01K 13/00* | (2006.01) | |
| *A46B 17/06* | (2006.01) | |
| *A46B 5/02* | (2006.01) | |
| *A46B 17/00* | (2006.01) | |

(52) U.S. Cl.
CPC .......... *A01K 13/001* (2013.01); *A01K 13/002* (2013.01); *A46B 5/02* (2013.01); *A46B 17/06* (2013.01); *A46B 17/00* (2013.01); *A46B 2200/1093* (2013.01)

(58) Field of Classification Search
CPC ...... A01K 13/001; A01K 13/002; A46B 5/02; A46B 17/06; A46B 17/00; A46B 2200/1093
USPC ........................................... 15/114; 119/628
See application file for complete search history.

(56) References Cited

U.S. PATENT DOCUMENTS

| | | | | |
|---|---|---|---|---|
| 3,110,053 | A * | 11/1963 | Surabian | A46B 9/10 15/159.1 |
| 4,574,416 | A * | 3/1986 | Stewart | A46B 7/023 119/628 |
| 4,856,541 | A | 8/1989 | Kellett et al. | |
| 5,267,528 | A * | 12/1993 | Murieen, Sr. | A46B 17/06 119/628 |
| 5,519,912 | A * | 5/1996 | Kawamura | A46B 7/023 119/628 |
| 5,862,563 | A * | 1/1999 | Hartmann | A46B 17/06 119/628 |
| 5,890,255 | A * | 4/1999 | Robinson | A46B 17/06 119/628 |
| 6,289,546 | B1 * | 9/2001 | Harada | A46D 3/00 15/167.1 |
| 6,427,633 | B1 | 8/2002 | Ogden | |

(Continued)

*Primary Examiner* — Weilun Lo
(74) *Attorney, Agent, or Firm* — Jacob M. Ward; Ward Law Office LLC

(57) ABSTRACT

A self-cleaning brush assembly for grooming and cleaning pets has a main body and a pair of contoured handle portions depending therefrom. The main body has a plurality of bristles that extend through a scrub pad and a cleaning element. The scrub pad and the cleaning element both have a plurality of openings that are configured to receive the plurality of bristles. The brush assembly is also self-cleaning and capable of removing pet hair from the bristles. As the brush assembly is lifted off the pet, the resilient cleaning element flexes away from the main body, moving the scrub pad with it over the bristles. The movement of the scrub pad functions to clean the bristles and deposit the entrained pet hair onto the outer surface of the scrub pad.

12 Claims, 7 Drawing Sheets

(56) References Cited

U.S. PATENT DOCUMENTS

| | | | |
|---|---|---|---|
| 7,337,784 B2 | 3/2008 | Hurwitz | |
| 10,233,285 B2* | 3/2019 | Yang | C09D 171/02 |
| 2006/0102094 A1* | 5/2006 | Dunn | A01K 13/001 |
| | | | 119/632 |
| 2006/0207623 A1* | 9/2006 | Kung | A01K 13/002 |
| | | | 132/119 |
| 2006/0230559 A1* | 10/2006 | Knopow | A47L 13/18 |
| | | | 15/104.002 |
| 2007/0033758 A1* | 2/2007 | Wang | A46B 17/06 |
| | | | 15/169 |
| 2007/0180637 A1* | 8/2007 | McKay | A01K 13/002 |
| | | | 15/22.1 |
| 2011/0088186 A1* | 4/2011 | Hilmann | A01K 13/002 |
| | | | 15/106 |
| 2015/0000609 A1* | 1/2015 | Frye | A01K 13/003 |
| | | | 119/601 |
| 2018/0132452 A1* | 5/2018 | Dionne | A01K 13/002 |

* cited by examiner

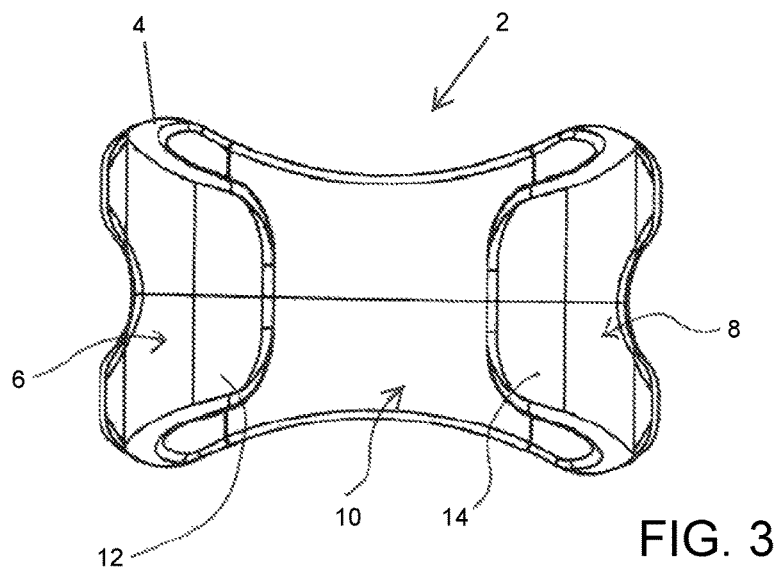
FIG. 3
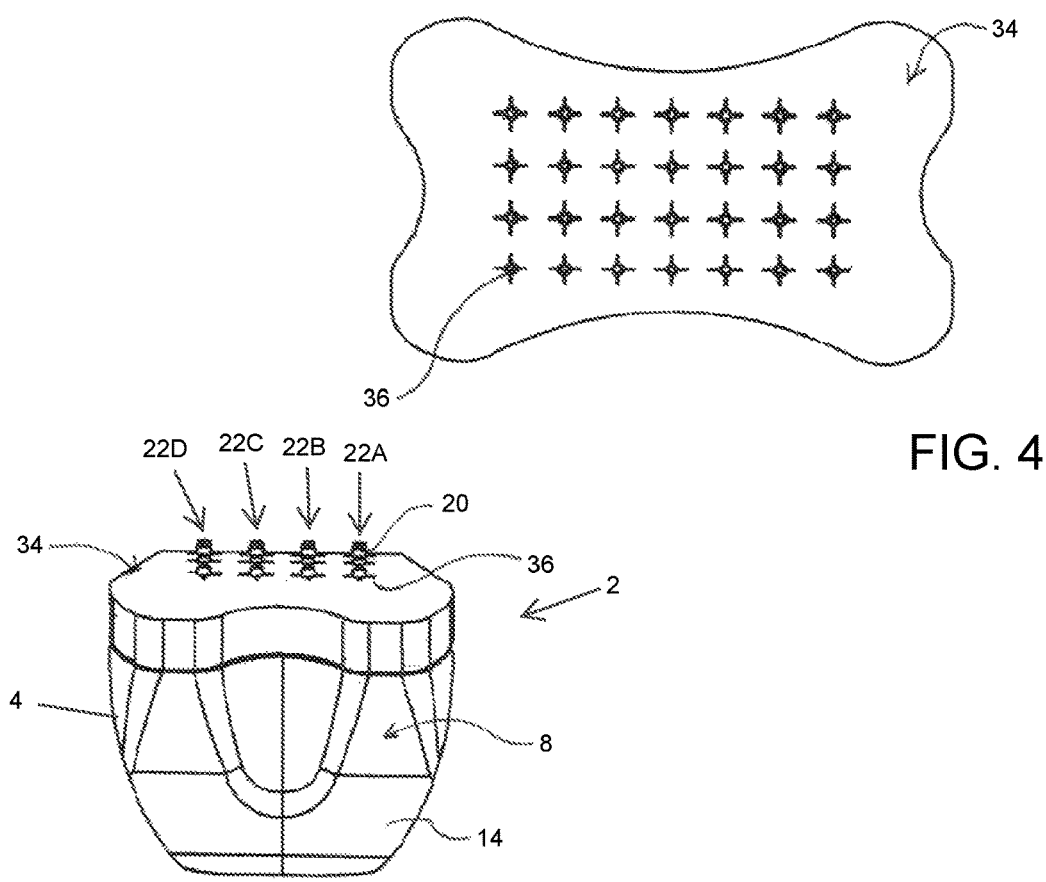
FIG. 4
FIG. 5

SELF-CLEANING PET GROOMING SCRUB BRUSH

CROSS REFERENCE TO RELATED APPLICATIONS

This application claims the benefit of U.S. Provisional Application Ser. No. 62/523,953, filed on Jun. 23, 2017. The entire disclosure of the above application is hereby incorporated herein by reference.

FIELD

The present disclosure relates to brushes and, more specifically, to pet grooming brushes.

BACKGROUND

Hair brushes are notoriously difficult to clean, especially when used on pets. Conventionally, cleaning a brush involves removing the hair by hand, or using a separate tool to lift the hair entwined among the bristles. The separate tool may be a pick or a comb that must be inserted near the bristles and then leveraged to lift and remove the hair from those bristles.

Additionally, a conventional hair brush does not clean the hair while in use. Although a user may cover a brush with soap, it is well known that the detergent action of the soap or foam soap used while washing is often mitigated by water flowing continuously onto the fur or skin, which dilutes the detergent properties. To overcome such problems, it is common to use a sponge or a rag.

The prior art discloses a variety of brush design configurations where the bush is self-cleaning or able to wash the hair of a user. For example, U.S. Pat. No. 6,427,633 to Ogden, teaches a pet brush with a cleaning element for removing hairs from the brush after use. Also, U.S. Pat. No. 7,337,784 to Hurwitz discloses a hairbrush for people and pets that releases a perfume, fragrance, or other active compositions. In U.S. Pat. No. 4,856,541 to George Kellett, a hair cleaning and conditioning pad is disclosed.

There is a continuing need for a brush that is self-cleaning. Desirably, the brush also militates against a dilution of detergent or cleaning compound while washing a pet.

SUMMARY

In concordance with the instant disclosure, a brush assembly that is self-cleaning and which militates against a dilution of detergent or cleaning compound while washing a pet, has been surprisingly discovered.

In one embodiment, a brush assembly has a brush with a main body having a plurality of bristles, a first handle portion, and a second handle portion. The first handle portion and the second handle portion depend from the main body. The first handle portion and the second handle portion each have a free end. The free end of the first handle portion is spaced apart from the free end of the second handle portion. Furthermore, a scrub pad is removably connected to the main body. The scrub pad has a plurality of openings that receive the plurality of bristles on the main body of the brush.

In a further embodiment, a scrub pad has a main body with a first contoured side surface and a second contoured side surface. Disposed between the first contoured side surface and the second contoured side surface is a first major surface and second major surface. The main body has a plurality of openings formed through the first major surface and the second major surface. The main body also has a first contoured end surface, a second contoured end surface. The main body further has bulged corners that connect each of the first contoured side surface and the second contoured side surface with each of the first contoured end surface and the second contoured end surface.

In another embodiment, a brush has a plurality of bristles, a first handle portion, and a second handle portion. The first handle portion and the second handle portion depend from the main body. Each of the first handle portion and the second handle portion has a free end. The free end of the first handle portion is spaced apart from the free end of the second handle portion. A plurality of protrusions are disposed on the main body. The plurality of protrusions are configured to removably secure a scrub pad to the main body.

Further areas of applicability will become apparent from the description provided herein. It should be understood that the description and specific examples are intended for purposes of illustration only and are not intended to limit the scope of the present disclosure.

DESCRIPTION OF THE DRAWINGS

The above, as well as other advantages of the present disclosure, will become clear to those skilled in the art from the following detailed description of a preferred embodiment when considered in the light of the accompanying drawings in which:

FIG. 3 is a bottom plan view of the brush assembly shown in FIG. 1;

FIG. 4 is a top plan view of the brush assembly shown in FIG. 1;

FIG. 5 is a right side elevational view of the brush assembly shown in FIG. 1;

DETAILED DESCRIPTION

Figure 1:
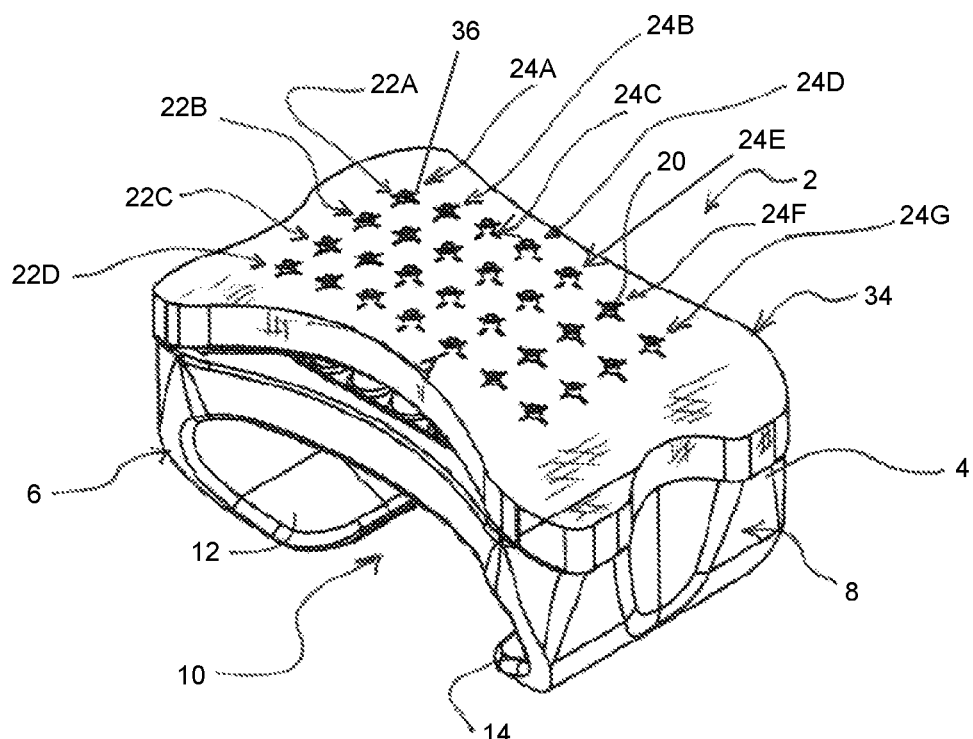
FIG. 1 is a top perspective view of a brush assembly according to one embodiment of the present disclosure.
Figure 2:
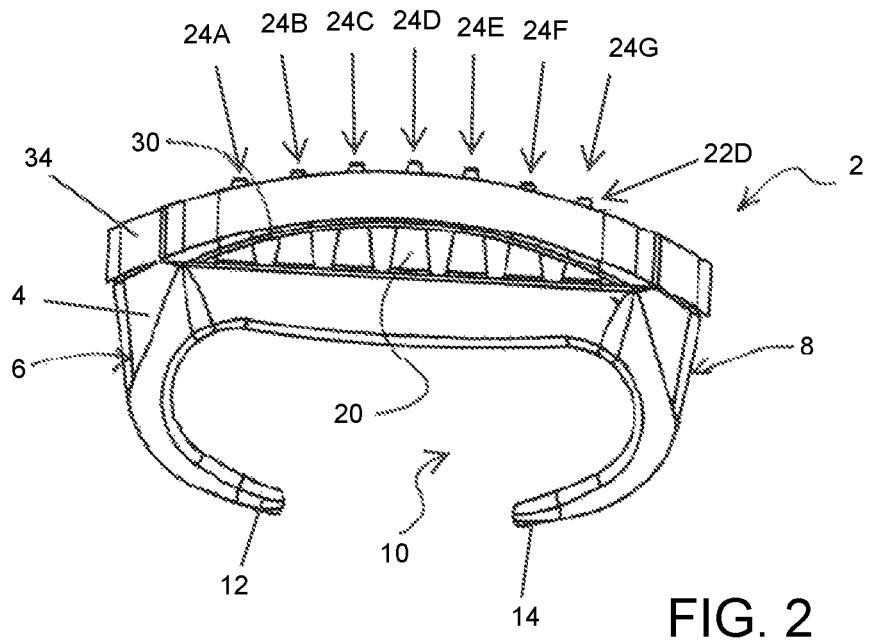
FIG. 2 is a front elevational view of the brush assembly shown in FIG. 1.

The following description is merely exemplary in nature and is not intended to limit the present disclosure, application, or uses. Throughout the drawings, corresponding reference numerals indicate like or corresponding parts and features.

In FIGS. 1-7, a brush assembly 2 is shown. The brush assembly 2 includes a brush with a main body 4 and a pair of handle portions 6, 8 depending therefrom. The handle portions 6, 8 create a handgrip area 10 which allows a user, not shown, to grip the brush assembly 2.

The handle portions 6, 8 are defined by a first handle portion 6 and a second handle portion 8. The first handle portion 6 has a first free end 12, and the second handle portion 8 has a second free end 14. The first free end 12 of the first handle portion 6 is spaced apart from the second free end 14 of the second handle portion 8. Additionally, the first handle portion 6 is contoured in a first direction, and the second handle portion 8 is contoured in a second direction. The first free end 12 of the first handle portion 6 faces the second free end 14 of the second handle portion 8.

In particular embodiments, the main body 4 may be formed of a rubber/silicone, or synthetic resin material, such as polyethylene, polyvinyl chloride, polystyrene, polyvinyl acetate, polypropylene, polymethacrylic acid, and acrylonitrile butadiene styrene, all as non-limiting examples. One of ordinary skill in the art may also select other suitable shapes, dimensions, and materials for the main body 4, as desired.

Figure 7:
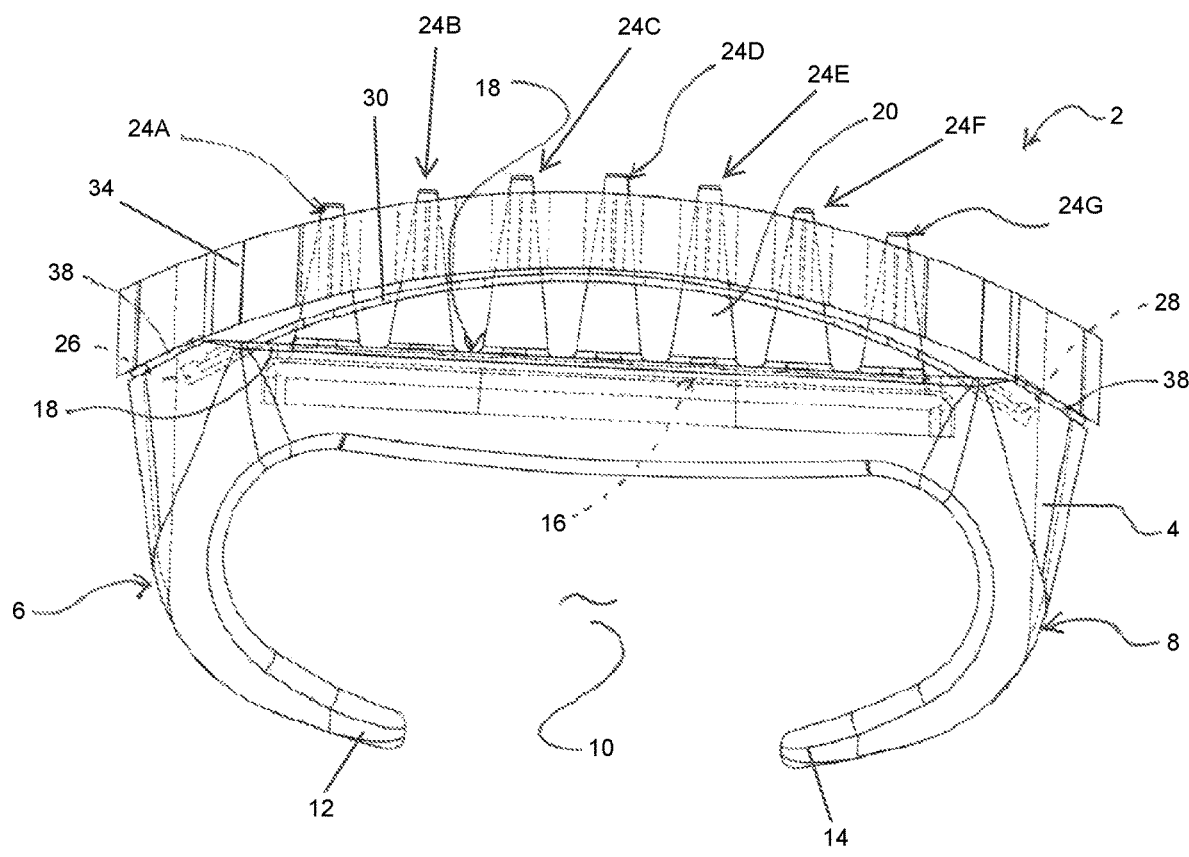
FIG. 7 is an enlarged front elevational view of the brush assembly illustrated in FIG. 1, with hidden structure shown using broken lines.

Referring to FIG. 7, the main body 4 may have a recessed central receiving area 16 that is configured to receive a bristle insert 18. The bristle insert 18 has a plurality of upstanding bristles 20 of varying lengths. As a non-limiting example, the bristles 20 disposed laterally closest to the first handle portion 6 and the bristles 20 disposed laterally closest to the second handle portion 8 may be shorter in length than the bristles 20 disposed laterally furthest from the first handle portion 6 and the second handle portion 8.

The bristles 20 are shown in FIGS. 1-7 having a generally frustoconical shape; however, the bristles 20 may be any suitable shape as chosen by a skilled artisan. The bristle insert 18 may be secured to the main body 4 using a mechanical fastener, adhesive, or any method chosen by one of ordinary skill in the art.

Although the main body 4 is shown in FIGS. 1-7 having a bristle insert 18, in certain embodiments, for example, as shown in FIGS. 10-13, the bristles 20 may be integrally molded with the main body 4.

The bristles 20 are aligned in a plurality of longitudinal rows 22A-22D and correspondingly transverse columns 24A-24G. As best illustrated in FIG. 7, the bristles 20 of the centermost bristle column 24D are of a greatest length relative to the other bristles 20 in the other bristle columns 24A-24C and 24E-24G. Top surfaces of the other bristles 20 in the adjacent bristle columns 24A-24C and 24E-24G are vertically and horizontally spaced apart from the top surfaces of the bristles 20 of the centermost bristle column 24D. In a most particular example, the top surfaces of the bristles 20 in the columns 24A-G, being of varying lengths, may define a discontinuous but generally arcuate surface. However, it should be understood that other suitable arrangements for the bristles 20 may also be employed within the scope of the present disclosure.

Figure 6:
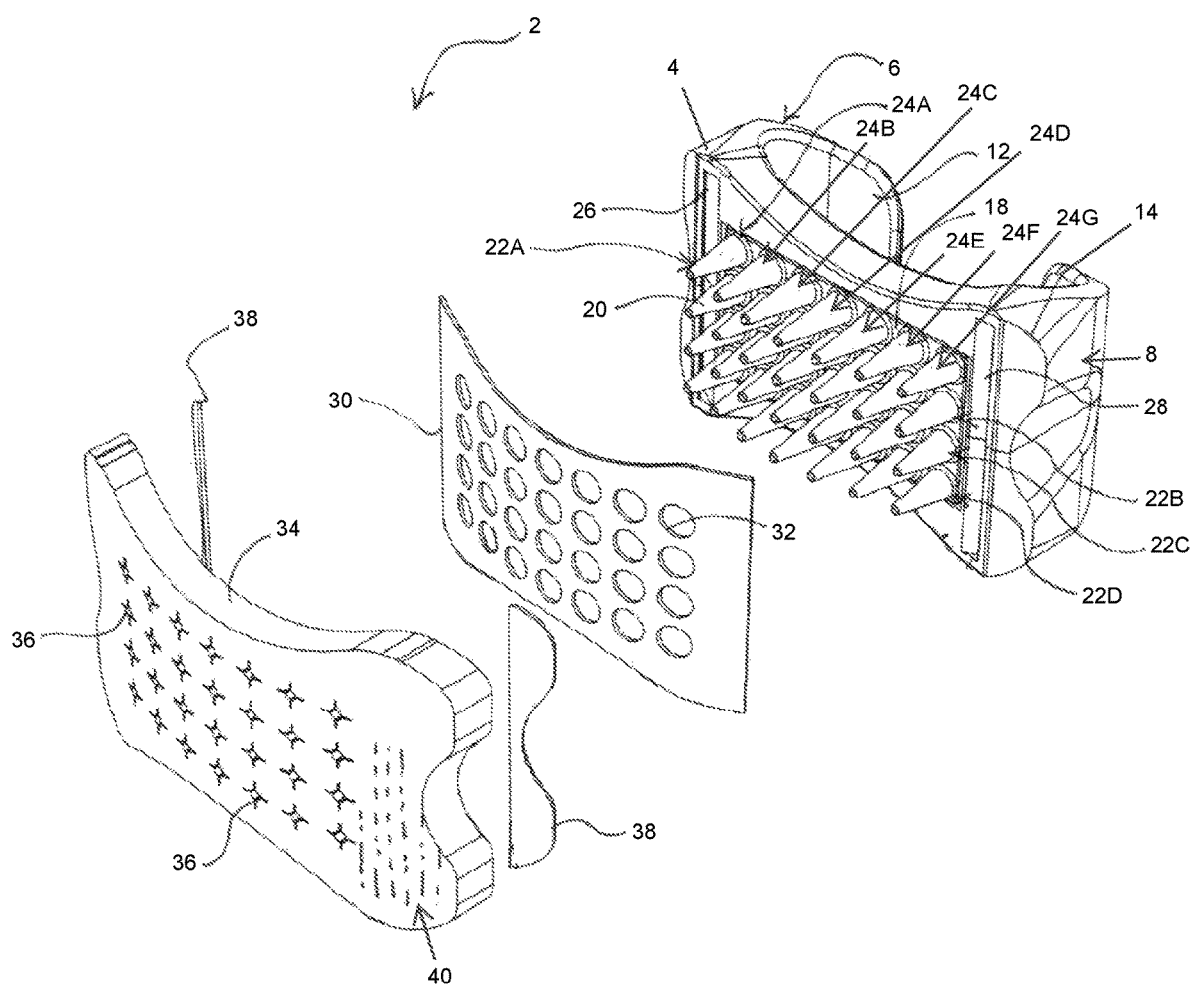
FIG. 6 is an exploded top perspective view of the brush assembly shown in FIG. 1.

In a further embodiment, shown in FIG. 6, the main body 4 has oppositely disposed mounting slots 26, 28 at its respective ends that are configured to secure a cleaning element 30. The cleaning element 30 may be an hour-glass shape, or a generally rectangular configuration with oppositely disposed parallel ends and contoured side edges. The cleaning element 30 is movably secured to the main body 4 by inserting respective ends of the cleaning element 30 into the corresponding mounting slots 26 and 28 of the main body 4.

Additionally, a plurality of apertures 32 are formed in the cleaning element 30. The apertures 32 are arranged for aligned registration over the plurality of bristles 20, illustrated in FIG. 7. The cleaning element 30 may be made of a resilient flexible material, such as a plastic, rubber, silicone, or any other resilient material chosen by a skilled artisan. Additionally, one of ordinary skill in the art may also select other suitable shapes, dimensions, and materials for the cleaning element 30, as desired.

The brush assembly 2 also has a scrub pad 34. The scrub pad 34 may have contoured parallel sides and curved ends, for example, resembling the shape of a dog-bone, as illustrated in FIG. 4. A plurality of openings 36 are formed in the scrub pad 34. The openings 36 are in aligned registration with the corresponding pattern of the plurality of bristles 20 and the apertures 32 in the cleaning element 30, as shown in FIGS. 1-2 and 6-7. The openings 36 in the scrub pad 34 may be star shaped. It should be appreciated that the star shape of the openings 36 may result in less contact between the scrub pad 34 and the bristles 20, resulting in less friction and easier movement of the scrub pad 34 along the lengths of the bristles 20 in operation.

Additionally, the star shape allows the scrub pad 34 to move along the entire length of the bristles 20. For example, the bristles 20 may be tapered, with the bristle surfaces proximal to the main body being wider than the bristle surfaces distal from the main body 4. The star shape allows the scrub pad 34 to flex and form a partial seal along the entire length of the bristles 20. The partial seal militates against hair from being forced through the openings 36 and under the scrub pad 34 in operation. This permits the scrub pad 34 to clean the hair off the bristles 20, as described further herein. The scrub pad 34 may be made of sponge, cellulose, polyester, or polyurethane, as non-limiting examples. One of ordinary skill in the art may also select other suitable shapes, dimensions, and materials for the scrub pad 34, as desired.

With continued reference to FIG. 6, in certain embodiments, the scrub pad 34 is removably secured to the main body 4 by a pair of flexible interlocking hook and loop fastener assemblies 38. However, it should be appreciated that the scrub pad 34 may be disposed on the main body 4 by any other suitable method chosen by a skilled artisan (e.g., the protrusions shown in FIGS. 10-13). The scrub pad 34 is removable from the brush assembly 2 and replaceable as needed.

Additionally, the scrub pad 34 may be impregnated with a cleaning compound 40 (indicated as broken lines). As a non-limiting example, the cleaning compound may be a pet friendly detergent or cleaning compound such as a polysorbate, and more specifically polysorbate-20. Polysorbate-20 is a surfactant and emulsifier used in cleaners and personal care products. Other suitable types of cleaning compounds may also be selected within the scope of the present disclosure.

A most particular embodiment of the present disclosure is further shown in FIGS. 8-13. Like or related structure to that shown in FIGS. 1-7 is identified in FIGS. 8-13 with the same reference number in a 100-series for purpose of clarity.

Figure 12:
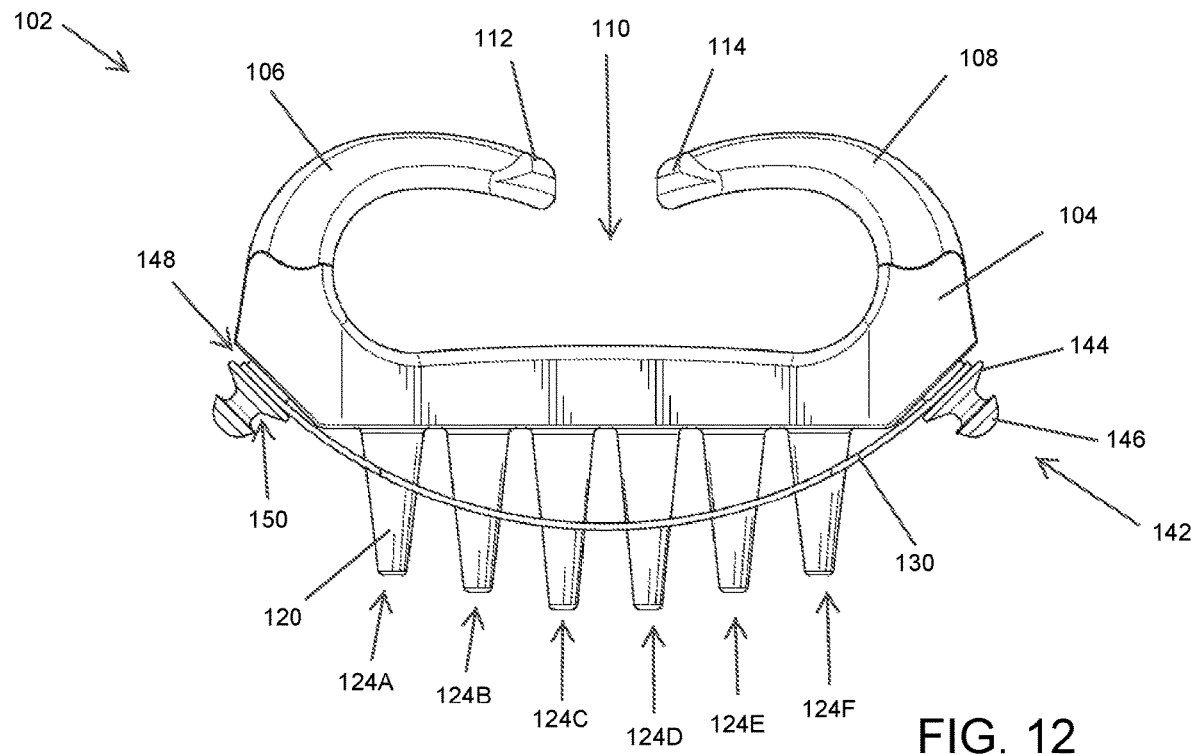
FIG. 12 is a front elevational view of the brush assembly shown in FIG. 10.
Figure 13:
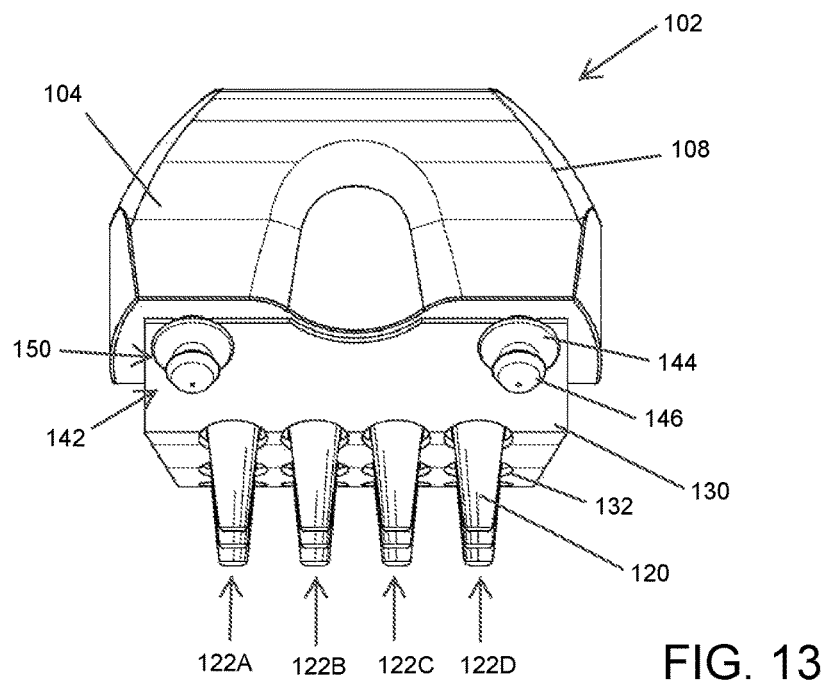
FIG. 13 is a right side elevational view of the brush assembly shown in FIG. 10.

As shown in FIGS. 10-13, the main body 104 of the brush assembly 102 has a plurality of integrally molded bristles 120 aligned in multiple longitudinal rows 122A-122D and corresponding transverse columns 124A-124F. As illustrated in FIG. 12, the bristles 120 of the center bristle columns 124C and 124D are of the greatest length relative to the bristles 120 of the other bristle columns 124A-124B and 124E-124F. Top surfaces of the bristles 120 in the adjacent bristle columns 124A-124B and 124E-124F are vertically and horizontally spaced apart from the top surfaces of the bristles 120 in the center bristle columns 124C and 124D. In a most particular example, the top surfaces of the bristles 120 in the columns 124A-124F, being of varying lengths, may define a discontinuous but generally arcuate surface. However, it should be understood that other suitable arrangements for the bristles 120 may also be employed within the scope of the present disclosure.

As illustrated in FIGS. 10-13, the main body 104 of the brush assembly 102 has a plurality of protrusions 142, for example, four protrusions 142 with each of the four protrusions 142 generally disposed at different corners of the main body 104. The protrusions 142 are configured to connect with both a cleaning element 130 and a scrub pad 134. The protrusions 142 have a skirt 144 disposed adjacent but spaced apart from a bottom of the protrusion, and a bulb 146 disposed at a top of the protrusion 142 and spaced apart from the skirt 144. A volume between the main body 104 and the skirt 144 defines a first gap 148. A volume between the skirt 144 and the bulb 146 defines a second gap 150.

Figure 8:
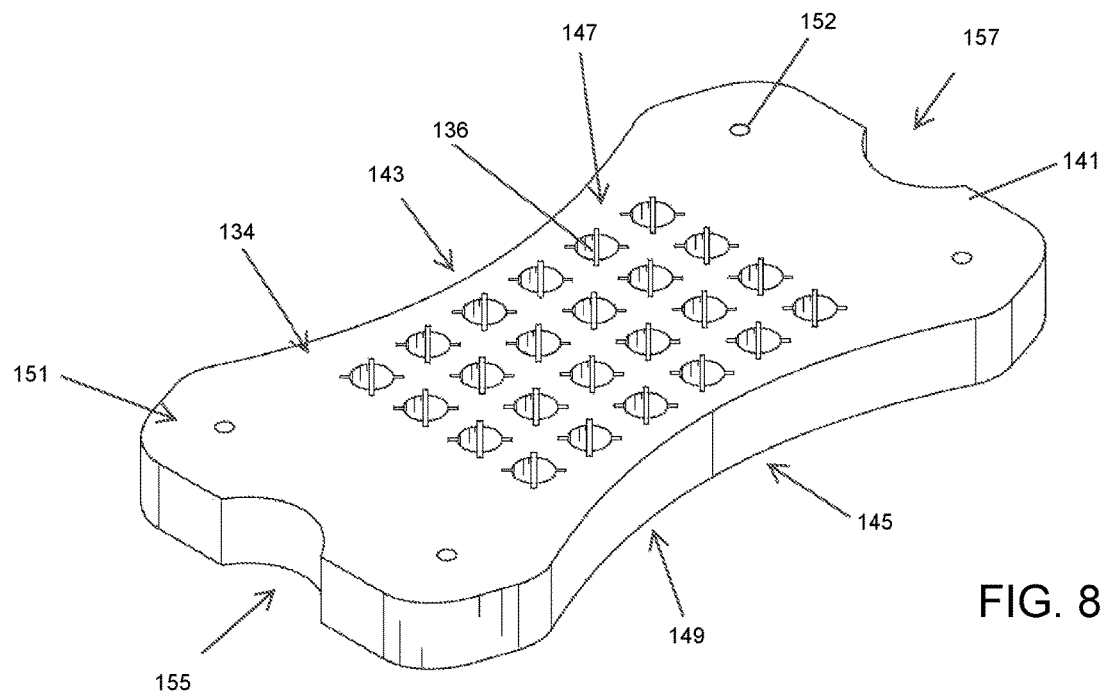
FIG. 8 is a top perspective view of a scrub pad according to a further embodiment of the present disclosure.
Figure 9:
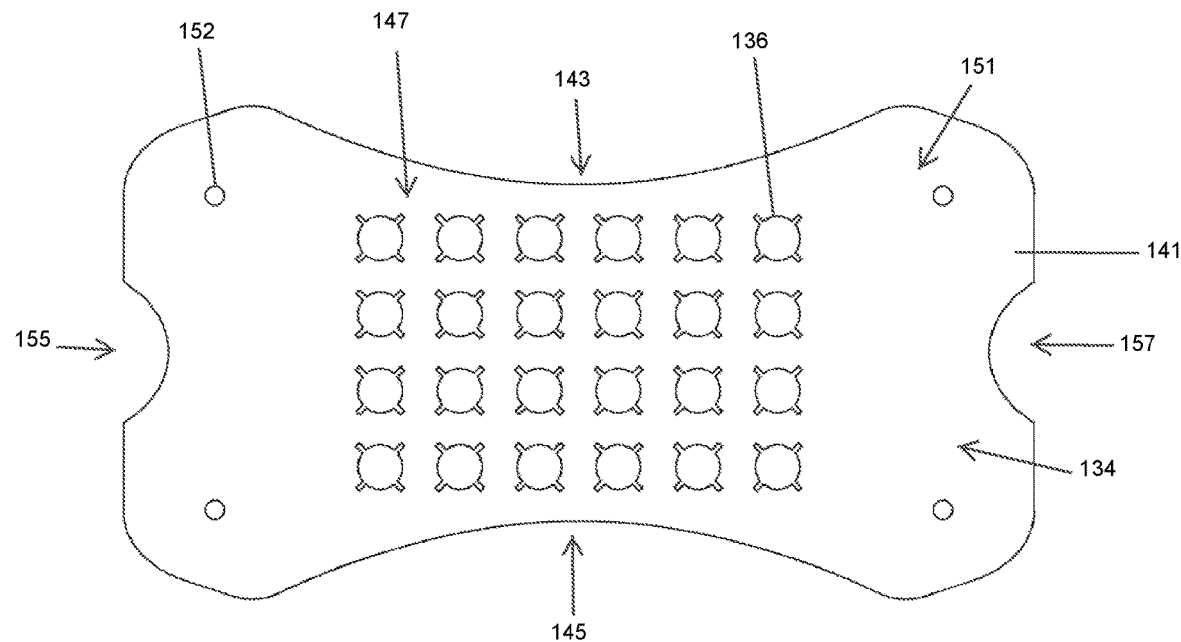
FIG. 9 is a top plan view of the scrub pad shown in FIG. 8.

As shown in FIGS. 8-9, the scrub pad 134 has a main body 141 with a first contoured side surface 143 and a second contoured side surface 145. The main body 141 of the scrub pad 134 also has a first major surface 147 and a second major surface 149. The first major surface 147 and second major surface 149 are disposed between the first contoured side surface 143 and the second contoured side surface 145. A plurality of openings 136 are formed in the first and second major surfaces 147, 149 and through the main body 141. Upon assembly with the brush, the openings 136 are in aligned registration with the corresponding pattern of the plurality of bristles 120 on the brush assembly 102.

Furthermore, at opposing ends of the main body 141 are bulged corners 151. The bulged corners 151 have apertures 152 formed therethrough. Each of the bulged corners 151 is disposed between and connects one of the first contoured side surface 143 and the second contoured side surface 145 with one of a first contoured end surface 155 and a second contoured end surface 157. The first and second contoured end surfaces 155, 157 may correspond generally in shape and location with recesses formed on outer surfaces of the first and second handle portions 106, 108. It should be appreciated that each of the first and second contoured end surfaces 155, 157 and the corresponding recesses on the first and second handle portions 106, 108 may facilitate a gripping of the brush assembly 102 by a user, and more specifically, may receive a thumb of the user when using the brush assembly 102 to wash the pet.

The scrub pad 134 may be formed from an elastic material that stretches around the bulb 146 of the protrusion 142. Once over the bulb 146 of the protrusion 142, the scrub pad 134 fills the second gap 150, thereby removably securing the scrub pad 134 to the main body 104. The bulb 146 militates against the scrub pad 134 inadvertently disconnecting from the protrusion 142.

In another embodiment, not shown, the scrub pad 134 may contain an integrated cleaning element 130 instead of a separate cleaning element, for example a plastic backing affixed to or otherwise integrated with the scrub pad 134. In this instance, the integral plastic backing may force the scrub pad 134 to the top surface of the bristles 120 in operation, resulting in a cleaning of the bristles 120 as described further hereinbelow.

Figure 10:
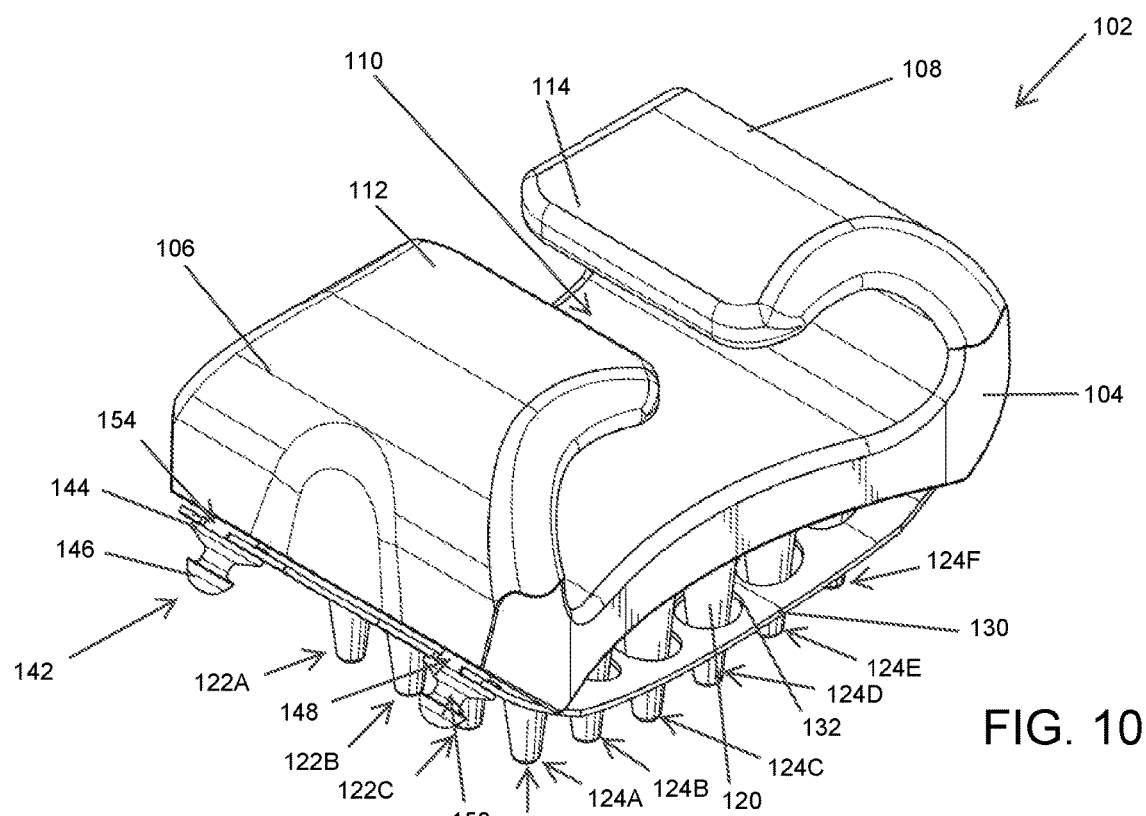
FIG. 10 is a bottom perspective view of a brush assembly according to another embodiment of the present disclosure, shown without a scrub pad.
Figure 11:
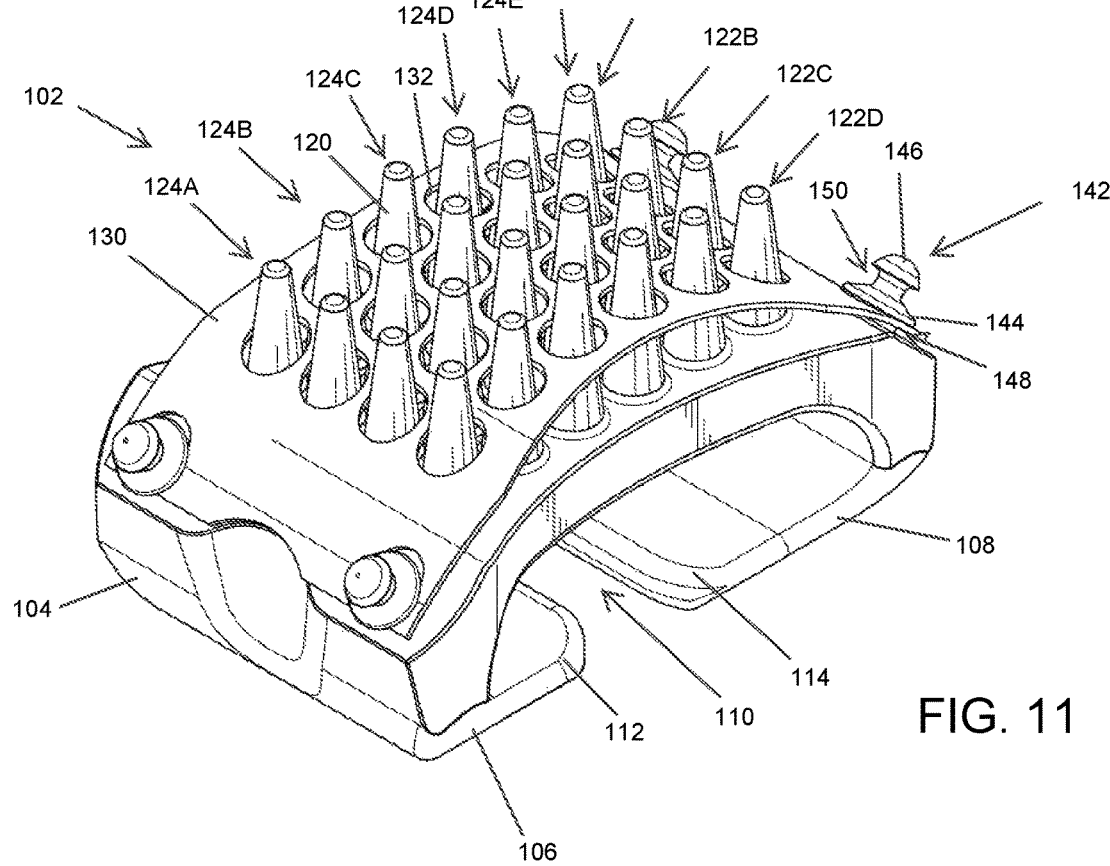
FIG. 11 is a top perspective view of the brush assembly shown in FIG. 10.

With renewed reference to FIG. 10, the cleaning element 130 has slots 154 that are formed in a perimeter of the cleaning element. The slots 154 are configured to receive the protrusions 142. In a most particular example, the cleaning element 130 adjacent the slots 154 is disposed in the first gaps 148 of the protrusions 142. Upon assembly, the force of the cleaning element 130 flexing outwardly relative to the main body 104 secures the cleaning element 130 to the protrusions 142.

Although the brush assembly 102 is shown in FIGS. 10-13 without having the scrub pad 134 disposed thereon, it should be understood that this is for purposes of illustration only. When fully assembled, the scrub pad 134 of FIGS. 8 and 9 is disposed on the brush assembly 102 of FIGS. 10-13.

For example, when fully assembled, the brush assembly 2, 102 has the plurality of bristles 20, 120 extending just above an outer surface of the scrub pad 34, 134. In operation, the brush assembly 2, 102 is pressed against a body of a pet, not shown, so that the scrub pad 34, 134 and the cleaning element 30, 130 are deflected inwardly toward the main body 4, 104 and over the bristles 20, 120. The movement of the cleaning element 30, 130 and the scrub pad 34, 134 toward the main body 4, 104 allows the bristles 20, 120 to fully engage the body of the pet. As the brush assembly 2, 102 is lifted off the pet, the resilient cleaning element 30, 130 flexes outwardly and away from the main body 4, 104, thereby moving the scrub pad 34, 134 with it over the length of the bristles 20, 120. The movement of the scrub pad 34, 134 away from the main body 4, 104 functions to clean the bristles 20, 120 and deposit the entrained pet hair, not shown, onto the surface of the scrub pad 34, 134, for subsequent easy removal by the user.

It should be understood that the grooming of the pet will often occur during a bath. As the user, not shown, wets the pet and the scrub pad 34, 134, the cleaning compound 40 that impregnates the scrub pad 34, 134 may be activated to facilitate a cleaning of the pet. Additionally, while the cleaning compound 40, 140 cleanses the pet, the cleaning element 30, 130 pushes the entrained pet hair to the top of the scrub pad 34, 134 for removal by the user. The cleaning element 30, 130 and cleaning compound 40 work synergistically to wash the pet and remove any loose hair.

Advantageously, the brush assembly 2, 102 of the present disclosure is self-cleaning by removing pet hair from the bristles 20, 120 as described hereinabove. The brush assembly 2, 102 has also been found to militate against a dilution of the detergent or cleaning compound while washing the pet.

While certain representative embodiments and details have been shown for purposes of illustrating the invention, it will be apparent to those skilled in the art that various changes may be made without departing from the scope of the disclosure, which is further described in the following appended claims.

What is claimed is:

1. A brush assembly, comprising:
   a brush with a main body having a plurality of bristles, a first handle portion, and a second handle portion, the first handle portion and the second handle portion depending from the main body, and each of the first handle portion and the second handle portion having a free end, the free end of the first handle portion being spaced apart from the free end of the second handle portion;
   a scrub pad removably connected with the main body, the scrub pad having a plurality of openings; and
   a resilient cleaning element movably secured to the main body and disposed between the scrub pad and the main body, the cleaning element having a plurality of apertures formed therein; and wherein the plurality of bristles of the brush are disposed through the plurality of apertures of the cleaning element and the plurality of openings of the scrub pad, and the cleaning element is flexible such that at least a portion of the cleaning element is immovable relative to the main body while simultaneously at least another portion of the cleaning element is movable away from the main body and moves at least a portion of the scrub pad away from the main body to move entrained pet hair from the plurality of bristles for removal.

2. The brush assembly of claim 1, wherein the first handle portion is contoured in a first direction, and the second handle portion is contoured in a second direction, and wherein the free end of the first handle portion faces the free end of the second handle portion.

3. The brush assembly of claim 1, wherein the scrub pad and the cleaning element have contoured side edges.

4. The brush assembly of claim 1, wherein the scrub pad is impregnated with a cleaning compound.

5. The brush assembly of claim 1, wherein the main body has a plurality of protrusions, each of the protrusions having a skirt and a bulb, the skirt spaced apart from the bulb and the main body, wherein a volume between the main body and the skirt defines a first gap, and a volume between the skirt and the bulb defines a second gap.

6. The brush assembly of claim 5, wherein each of the protrusions is disposed through an aperture formed in the scrub pad, and a portion of the scrub pad adjacent the aperture is received by the second gap of the protrusion.

7. The brush assembly of claim 5, wherein the cleaning element further has a plurality of slots, and wherein each of the protrusions is disposed in one of the slots, and a portion of the cleaning element adjacent the slot is received by the first gap of the protrusion.

8. The brush assembly of claim 1, wherein the bristles are frustoconical in shape.

9. The brush assembly of claim 1, wherein the bristles disposed laterally closest to the first handle portion and the bristles disposed laterally closest to the second handle portion are shorter in length than the bristles disposed laterally furthest from the first handle portion and the second handle portion.

10. The brush assembly of claim 1, wherein the scrub pad is dog-bone shaped.

11. The scrub pad brush assembly of claim 4, wherein the cleaning compound is polysorbate-20.

12. The brush assembly of claim 1, wherein each of the openings of the scrub pad is star shaped.

* * * * *